C. F. RUBSAM.
VEHICLE WHEEL.
APPLICATION FILED FEB. 5, 1918.
1,311,842.
Patented July 29, 1919.
2 SHEETS—SHEET 1.
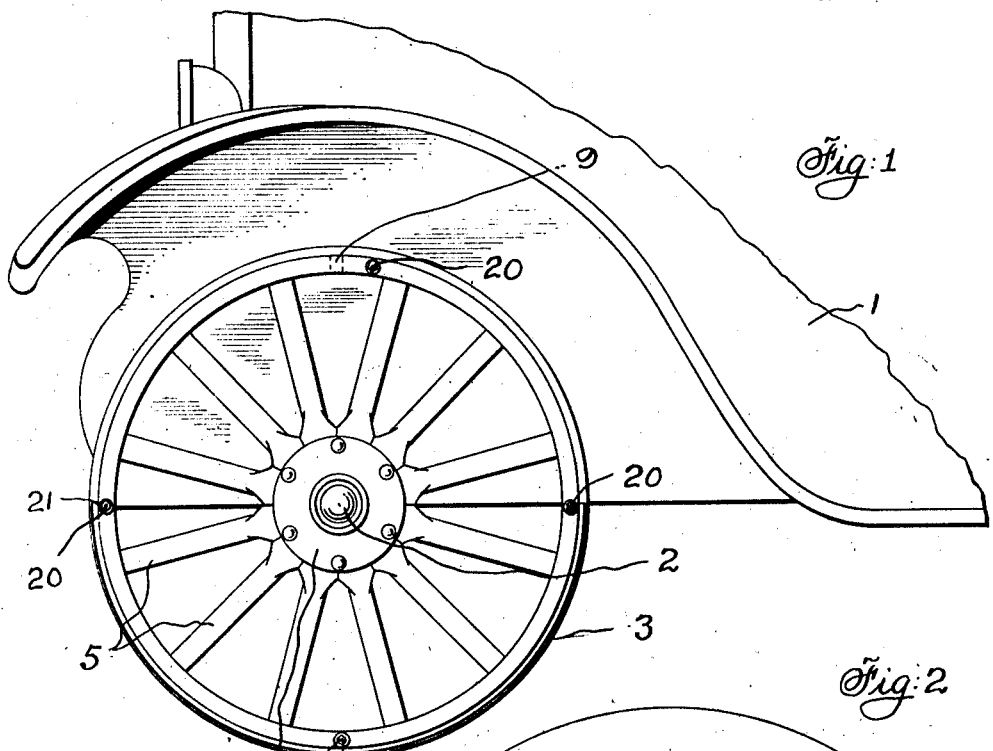
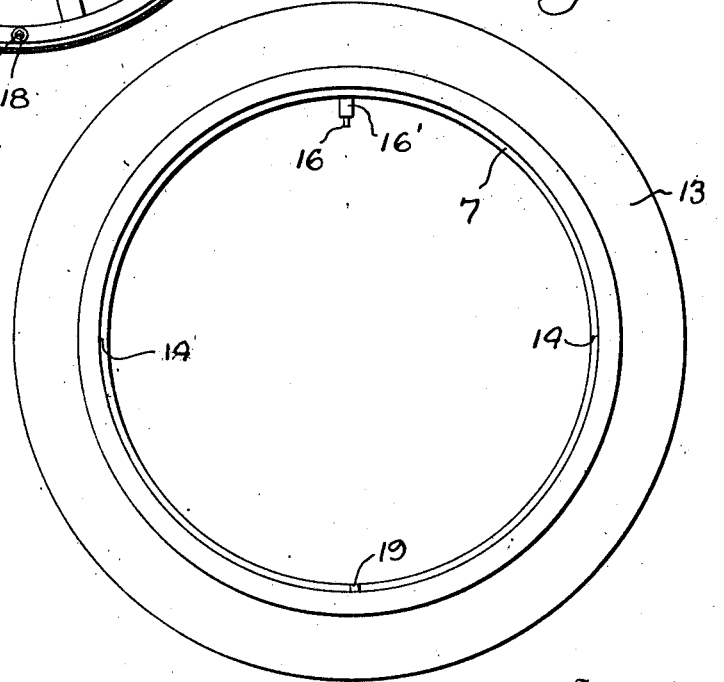
Charles F. Rubsam, Inventor
By his Attorneys
Emery, Booth, Janney & Varney.

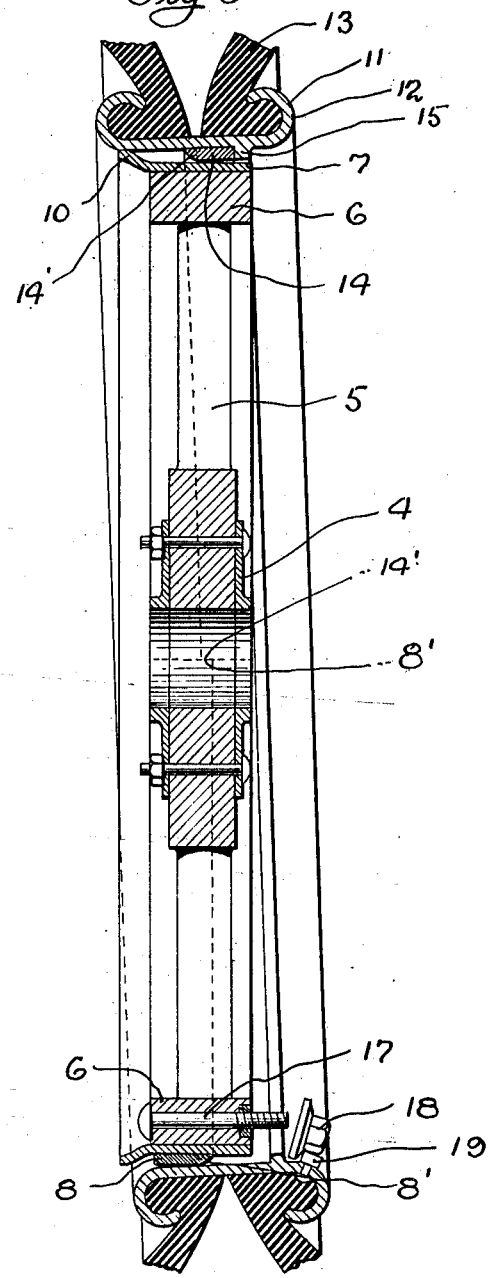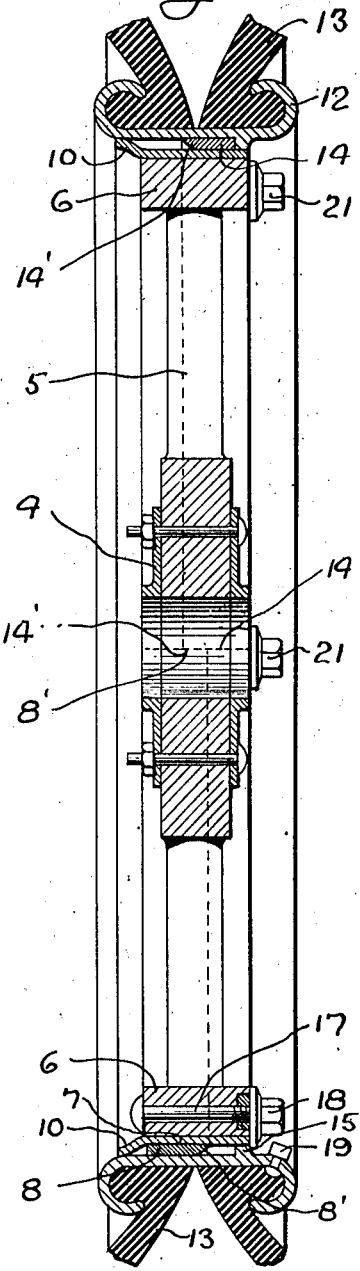

UNITED STATES PATENT OFFICE.

CHARLES F. RUBSAM, OF BROOKLYN, NEW YORK.

VEHICLE-WHEEL.

1,311,842.  Specification of Letters Patent.  Patented July 29, 1919.

Application filed February 5, 1918. Serial No. 215,429.

*To all whom it may concern:*

Be it known that I, CHARLES FERDINAND RUBSAM, a citizen of the Republic of France, and a resident of the borough of Brooklyn, city, county, and State of New York, have invented an Improvement in Vehicle-Wheels, of which the following is a specification.

My invention relates to vehicle wheels, especially such as are used for automobiles and the like, and more particularly to those types of wheels which are provided with demountable or removable rims.

One of the objects of my present invention is to provide a vehicle wheel having a readily removable rim which may be applied and positioned without the use of wedging members. It is a further object of the present invention to provide a vehicle wheel the rim of which will have a tight fit on the wheel body when in position thereon, and which will be easily applied to the wheel body or removed from the same by swinging or pivotal movements about the same.

For purposes of illustration I have shown a preferred embodiment of my invention and in the accompanying drawings wherein:

Figure 1 is an elevational view of the wheel body with the rim removed;

Fig. 2 is an elevational view of the rim;

Fig. 3 is a cross-section of the wheel body showing the rim being applied thereto; and Fig. 4 is a cross-section of the wheel body with the rim in position thereon.

1 indicates a vehicle, such as an automobile or the like, on the axle 2 of which is mounted the vehicle wheel 3, comprising a hub portion 4 and spokes 5. Attached to the spokes by any suitable means is the felly 6 which may be provided with the felly band 7 and the raised bearing band or surface 8 which is preferably so disposed as to be adjacent that periphery of the felly which is nearer to the vehicle. The felly is provided with the usual aperture 9 for permitting the passage of the tire valve therethrough in those cases where a pneumatic tire is employed. Along that periphery of the felly band which is adjacent to the vehicle said felly band is provided with the flange member 10 which may be attached to the felly 6 by any suitable means. Coöperating with the felly and its associated bearing band is the removable or demountable rim 11 comprising, preferably, a tire holding portion 12 which serves to position and retain the tire 13. Along the inner face of the rim and preferably adjacent that periphery of the same which is remote from the vehicle I provide the raised bearing band or surface 14. Along the outer periphery of the rim I provide the reinforcing flange 15. The rim 11 and its associated tire 3 are provided in the usual manner with the tire valve 16. I prefer to provide the rim portion 12 with a thimble 16' rigidly attached to said rim portion and surrounding the tire valve 16 so that during the acts of applying the rim to and removing the same from the felly, the strains incidental to such acts will be borne not by the tire valve but by the thimble.

In the form illustrated I prefer to provide such an arrangement of parts as will enable the rim 11 to be applied to the wheel body by a pivotal or swinging movement about one point or portion of the felly as a fulcrum. Preferably this point or portion comprises that part of the wheel body which is adjacent the aperture 9 through which the tire valve 16 passes. In order to provide an efficient and tight fit of the rim on the wheel body while still permitting easy application of the rim to and its removal from the felly, I make the bearing surfaces 8 and 14 substantially cylindrical in form and so dispose the same that they will extend along a part only of the circumference and width of the wheel body and rim respectively. Preferably the bearing band 8, which may be attached to the felly 6 and its associated felly band 7 by any suitable means, such as welding or riveting, for example, extends through an arc 180° or less along the circumference of the felly and is preferably of uniform width. The bearing band 8 is preferably applied to the wheel body along that periphery of the same which is adjacent the vehicle. The bearing band 14, on the other hand, is preferably applied along the inner surface of the rim 11 adjacent that periphery of the same which is remote from the vehicle, and is attached to the rim by any suitable means. The bearing band 14 extends through an arc of 180° or less and is preferably so arranged that the fulcrum about which the rim is swung into position on the wheel body will be substantially adjacent the central circumferential point of said band 14 when the rim is in position on the wheel body. In this position the parts 8 and 14 will be in opposed or complementary relation. The bearing bands 8 and 14, which may be discontinuous and in sections, but are preferably, as shown, continuous in length, preferably extend across a part only of the width of the felly and rim respectively. For the proper manipulation of the rim onto and off the wheel body, it is desirable that the bearing surfaces 8 and 14 be so proportioned that the surface 8 will not extend substantially to one side of the vertical line drawn through the center of the fulcrum portion in the view shown in Fig. 3, while the surface 14 will not extend substantially to the other side of said line when the rim is being swung into position on the felly or just after the rim has been swung into such position. If these surfaces are extended beyond said line, as may be desirable in some instances, they may be tapered off along the extended portions of the same so that the rim may be applied to the wheel body without wedging, as shown at 8' and 14', respectively. Similarly, the circumferential extent of the bands 8 and 14 is preferably so chosen that the same will not overlap. Where it is desired to extend the bearing bands so that the same occupy arcs greater than 180°, the bearing bands may be tapered off along the extended portions to facilitate the application of the rim to and its removal from the wheel body.

The application of the rim to the wheel body and its removal from the same will be substantially clear from the above description. In order to apply the rim to the wheel body the rim is so placed with respect to the wheel body that the tire valve 16 may pass through the aperture 9, which aperture is large enough to permit free play of the tire valve within said aperture. Thereupon the rim is swung about the wheel body, the point or portion of the wheel body adjacent the aperture 9 serving as a fulcrum. An inspection of Figs. 3 and 4 will show that the arrangement of the various parts is such as to permit the rim to be swung into position on the wheel body without forcing or wedging the same, the rim when in position on the wheel body having a snug fit with the same along the entire extent of the opposite disposed bearing surfaces 8 and 14 where the same contact with the opposed surfaces of the rim and wheel body respectively. The tapered extended portions 8' and 14' will, as illustrated in Fig. 4, provide abutting locking means or portions to prevent circumferential movement of the rim on the wheel body.

I may provide any desirable or usual means for fixedly positioning the rim on the wheel body after the former has been applied to the latter. Preferably I employ a threaded bolt 17 fixedly positioned in the felly 6, preferably at a point diametrically opposite the aperture 9, and protruding from that side of the felly which is remote from the vehicle. Coöperating with the threaded bolt 17 is a removable threaded nut 18 which when applied to the bolt and operated in one direction serves, by engagement with the member 15 to position and retain the rim on the wheel body; while the operation of the bolt in the reverse direction serves, by engagement with the projection 19 which is securely attached to the rim portion 12, to displace the rim from the wheel body. In order to more securely position the rim on the wheel body I may provide the latter with a plurality of bolts 20, 20, similar to bolt 17 and operating in conjunction with the loose or removable nuts 21, 21 by the engagement of the latter with the member 15, to hold the rim securely on the wheel body. Since the nut 18 is loose and removable, it is apparent that the operation of said nut on its coöperating bolt 17 will result in the desired movements of the rim with respect to the wheel body without unduly straining either the rim or the wheel body.

It will be clear from the foregoing description that in the preferred form of my invention the bearing surface on the wheel body, as well as the bearing surface on the rim, is located on that part of the circumference of the wheel body or rim, as the case may be, which is 90° or less on either side of the vertical line through the fulcrum about which the rim is swung into position on the wheel body. It will also be noted that while the bearing surfaces are preferably cylindrical, this construction giving superior results, they may be of other conformation provided the rim has a tight fit on the wheel body when in position thereon, and provided further that the bearing surfaces, whatever their conformation, are properly disposed with relation to said vertical line. It is also to be noted that there is sufficient free play of the tire valve in the valve hole in the felly, and enough pressure exerted by the nuts and their coöperating bolts, to permit the rim to have some movement axially on the wheel body, after the rim has been swung into position on the wheel body, whereby that part of the tire-holding portion 12 which is nearest the vehicle will be brought flush against the flange portion 10 of the felly band to more securely position the rim on the wheel body.

It is of course to be understood that my invention is not limited to the particular embodiment shown and described herein by way of example.

Throughout the specification and claims, wherever the term "cylindrical" is employed, I mean to designate thereby any desired width of bearing surface down to an edge.

What I claim is:

1. A vehicle wheel comprising a wheel body having a peripheral portion, a removable rim for said wheel body, means associated with said wheel body and rim for permitting the latter to be swung into position on the former about a portion of the wheel body as a pivot, said means comprising a plurality of raised substantially cylindrical segmental bearing means interposed between said rim and wheel body, said segmental bearing means occupying portions of complementary arcs, one of said arcs including that portion of the felly about which the rim may be swung as a pivot.

2. A vehicle wheel comprising a wheel body having a peripheral portion, a removable rim for said wheel body, means associated with said wheel body and rim for permitting the latter to be swung into position on the former about a portion of the wheel body as a pivot, said means comprising a plurality of raised substantially cylindrical segmental bearing means interposed between said rim and wheel body, said segmental bearing means occupying portions of complementary arcs and being disposed substantially one on one side and another on the other side of the vertical plane passing through the pivot, one of said arcs including that portion of the wheel body about which the rim may be swung as a pivot.

3. A vehicle wheel comprising a wheel body having a peripheral portion, a removable rim for said wheel body, means associated with said wheel body and rim for permitting the latter to be swung into position on the former about a portion of the wheel body as a pivot, said means comprising a plurality of raised substantially cylindrical segmental bearing means interposed between said rim and wheel body, said segmental bearing means occupying portions of complementary arcs and being disposed substantially one on one side and another on the other side of the vertical plane passing through the pivot, one of said arcs including that portion of the wheel body about which the rim may be swung as a pivot, and the segmental bearing means comprised within said arc being disposed remote from the vehicle side of the wheel and adjacent the outer side of the same.

4. A vehicle wheel comprising a wheel body having a peripheral portion, a removable rim for said wheel body, means associated with said wheel body and rim for permitting the latter to be swung into position on the former about a portion of the wheel body as a pivot, said means comprising a plurality of raised substantially cylindrical segmental bearing means each extending through an arc of about 180° or less interposed between said rim and wheel body, said segmental bearing means occupying portions of complementary arcs and being disposed substantially one on one side and another on the other side of the vertical plane passing through the pivot, one of said arcs including that portion of the wheel body about which the rim may be swung as a pivot.

5. A vehicle wheel comprising a wheel body having a peripheral portion, a removable rim for said wheel body, means associated with said wheel body and rim for permitting the latter to be swung into position on the former about a portion of the wheel body as a pivot, said means comprising a plurality of raised substantially cylindrical segmental bearing means each extending through an arc of about 180° or less interposed between said rim and wheel body, said segmental bearing means occupying portions of complementary arcs and being disposed substantially one on one side and another on the other side of the vertical plane passing through the pivot, one of said arcs including that portion of the wheel body about which the rim may be swung as a pivot and the segmental bearing means comprised within said arc being disposed remote from the vehicle side of the wheel and adjacent the outer side or the same.

6. A vehicle wheel comprising a wheel body having a peripheral portion, a removable rim for said wheel body, means associated with said wheel body and rim for permitting the latter to be swung into position on the former about a portion of the wheel body as a pivot, said means comprising a plurality of raised substantially cylindrical segmental bearing means each extending through an arc of about 180° or less interposed between said rim and wheel body, said segmental bearing means occupying portions of complementary arcs and being disposed substantially one on one side and another on the other side of the vertical plane passing through the pivot, one of said arcs including that portion of the wheel body about which the rim may be swung as a pivot, said last-mentioned arc extending 90° or less on each side of said pivot, at least one of raised bearing means being fixedly associated with said wheel body.

7. A vehicle wheel comprising a wheel body having a peripheral portion, a removable rim for said wheel body, means associated with said wheel body and rim for permitting the latter to be swung into position on the former about a portion of the wheel body as a pivot, said means comprising a plurality of raised substantially cylindrical segmental bearing means each extending through an arc of about 180° or less interposed between said rim and wheel body, said segmental bearing means occupying portions of complementary arcs and being disposed substantially one on one side and another on the other side of the vertical plane passing through the pivot, one of said arcs including that portion of the wheel body about which the rim may be swung as a pivot, and the segmental bearing means comprised within said arc being disposed remote from the vehicle side of the wheel and adjacent the outer side of the same, said last-mentioned arc extending 90° or less on each side of said pivot, at least one of said bearing means being fixedly associated with said wheel body.

8. A vehicle wheel comprising a wheel body having a peripheral portion, a removable rim for said wheel body, means associated with said wheel body and rim for permitting the latter to be swung into position on the former about a portion of the wheel body as a pivot, said means comprising a plurality of raised bearing means interposed between said rim and wheel body, said raised bearing means occupying portions of complementary arcs and being disposed substantially one on one side and another on the other side of the vertical plane passing through the pivot, one of said arcs including that portion of the wheel body about which the rim may be swung as a pivot.

In testimony whereof, I have signed my name to this specification this 1st day of February, 1918.

CHARLES F. RUBSAM.